(12) United States Patent
Deng et al.

(10) Patent No.: US 11,886,072 B2
(45) Date of Patent: Jan. 30, 2024

(54) COLOR FILTER SUBSTRATE, ARRAY SUBSTRATE, AND DISPLAY PANEL

(71) Applicant: WUHAN CHINA STAR OPTOELECTRONICS TECHNOLOGY CO., LTD., Hubei (CN)

(72) Inventors: Qian Deng, Hubei (CN); Changchih Huang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 387 days.

(21) Appl. No.: 17/259,615

(22) PCT Filed: Nov. 23, 2020

(86) PCT No.: PCT/CN2020/130833
§ 371 (c)(1),
(2) Date: Jan. 12, 2021

(87) PCT Pub. No.: WO2022/088321
PCT Pub. Date: May 5, 2022

(65) Prior Publication Data
US 2022/0350198 A1 Nov. 3, 2022

(30) Foreign Application Priority Data
Oct. 26, 2020 (CN) .......................... 202011153461.4

(51) Int. Cl.
*G02F 1/1335* (2006.01)

(52) U.S. Cl.
CPC .. *G02F 1/133545* (2021.01); *G02F 1/133512* (2013.01); *G02F 1/133514* (2013.01); *G02F 2201/30* (2013.01); *G02F 2202/36* (2013.01)

(58) Field of Classification Search
CPC ......... G02F 1/133531; G02F 1/133528; G02F 1/133545; G02F 2001/133548
See application file for complete search history.

(56) References Cited

U.S. PATENT DOCUMENTS

2008/0252799 A1* 10/2008 Lee ..................... G02F 1/13362
359/485.05
2009/0009865 A1* 1/2009 Nishida ................ G02B 5/3058
427/163.1

(Continued)

FOREIGN PATENT DOCUMENTS

CN 101515044 A 8/2009
CN 104965340 A 10/2015
(Continued)

*Primary Examiner* — Jonathan Y Jung
(74) *Attorney, Agent, or Firm* — PV IP; Wei Te Chung; Zhigang Ma (57) ABSTRACT

The present application provides a color filter substrate, an array substrate and a display panel. A first dielectric grating layer in the color filter substrate is stacked with a first dielectric layer, and ridges and grooves are arranged at intervals periodically on one side of the first dielectric grating layer away from the first dielectric layer; a first polarizing layer in the color filter substrate is located in the grooves of the first dielectric grating layer; a second polarizing layer in the color filter substrate is located on the ridges of the first dielectric grating layer.

18 Claims, 3 Drawing Sheets

(56) References Cited

U.S. PATENT DOCUMENTS

| | | | | |
|---|---|---|---|---|
| 2012/0206676 A1* | 8/2012 | Chung | ............. | G02F 1/133516 |
| | | | | 349/97 |
| 2014/0028956 A1* | 1/2014 | Choi | ................ | G02F 1/133528 |
| | | | | 359/485.05 |
| 2016/0147080 A1* | 5/2016 | Son | ....................... | G02B 5/204 |
| | | | | 427/163.1 |
| 2018/0019238 A1* | 1/2018 | Kim | ................. | G02F 1/133528 |
| 2019/0339566 A1 | 11/2019 | Tan et al. | | |

FOREIGN PATENT DOCUMENTS

| | | | |
|---|---|---|---|
| CN | 105954932 | A | 9/2016 |
| CN | 106125316 | A | 11/2016 |
| CN | 106292049 | A | 1/2017 |
| CN | 106526952 | A | 3/2017 |
| CN | 107357075 | A | 11/2017 |
| CN | 110928035 | A | 3/2020 |
| KR | 20160056493 | A | 5/2016 |

\* cited by examiner

COLOR FILTER SUBSTRATE, ARRAY SUBSTRATE, AND DISPLAY PANEL

BACKGROUND OF INVENTION

Field of Invention

The present application relates to a display field, and particularly to a color filter substrate, an array substrate, and a display panel.

Description of Prior Art

Traditional CRT monitors rely on cathode ray tubes to emit electrons to hit phosphors on screens to display images, but a principle of liquid crystal displays (LCDs) is completely different. The LCDs are the first product developed and commercialized among flat panel displays (FPDs).

A vertical cross-sectional structure of a certain part of a display screen comprises an upper polarizer, a color filter substrate, an electrode (ITO), a liquid crystal layer (LC), an array substrate, and a lower polarizer from top to bottom. The color filter substrate and the array substrate have a certain distance from each other, and a plurality of electrodes on the color filter substrate and a plurality of electrodes on the array substrate are arranged opposite to each other. The liquid crystal layer is disposed between the color filter substrate and the array substrate, and a voltage is applied to liquid crystal molecules of the liquid crystal layer through the electrodes on the color filter substrate and the electrodes on the array substrate, then an arrangement of liquid crystal molecules is changed according to the voltage so as to display an image. Since the liquid crystal displays described above do not emit light, they need a light source to display images, therefore, the liquid crystal displays have backlight sources behind their liquid crystal panel. Light emitted by the backlight sources passes through the lower polarizer and then become polarized light with a certain polarization direction. Under torsion of the liquid crystal molecules, brightness of light emitted by the liquid crystal displays can be controlled, thereby controlling brightness of thin film transistor liquid crystal displays (TFT-LCDs). It is pixel voltage applied to the liquid crystal molecules that controls the torsion of the liquid crystal molecules. If electric field intensity is different, then a diversion angle of the liquid crystal molecules is different, light intensity transmitted through the liquid crystal displays is also different, and display brightness is different correspondingly. Desired color displays can be obtained by using combinations of different light intensities of three primary colors of RGB.

At present, ultra-thin display devices have become hot spots in the market, but existing polarizers are usually made of stretching polyvinyl alcohol (PVA) films. Since a thickness of the existing polarizers is about 100 μm, and a transmittance of the existing polarizers is about 42%, an energy utilization rate of light emitted from the existing polarizers is low. Therefore, how to reduce thicknesses of display structures in electronic devices and improve their light energy utilization rate is an important and difficult point that current liquid crystal display industries need to overcome continuously.

SUMMARY OF INVENTION

An objective of the present application is to solve a technical problem of how to reduce thicknesses of display structures in electronic devices and improve their light energy utilization rate.

On the one hand, the present application provides a color filter substrate, wherein the color filter substrate comprises a first substrate, a color filter functional layer and a first polarizing component that are stacked with one another, and the first polarizing component comprises:

at least one first dielectric layer;

a first dielectric grating layer, wherein the first dielectric grating layer is stacked with the first dielectric layer, and ridges and grooves are arranged at intervals periodically on one side of the first dielectric grating layer away from the first dielectric layer;

a first polarizing layer, wherein the first polarizing layer is located in the grooves of the first dielectric grating layer; and a second polarizing layer, wherein the second polarizing layer is located on the ridges of the first dielectric grating layer.

In a possible implement of the present application, the color filter functional layer is located between the first polarizing component and the first substrate.

In a possible implement of the present application, the color filter functional layer comprises a black matrix and a filter layer, the black matrix is provided with a plurality of matrix units, the filter layer comprises a plurality of filter units corresponding to the matrix units, and material of the filter units is quantum dots material.

In a possible implement of the present application, the first substrate is located between the first polarizing component and the color filter functional layer.

In a possible implement of the present application, the color filter functional layer is located on one side of the first polarizing component away from the first substrate.

In a possible implement of the present application, the first polarizing component further comprises:

a first base substrate, wherein the first base substrate is stacked with the first dielectric layer, and the first base substrate is located on one side of the first dielectric layer away from the first dielectric grating layer.

In a possible implement of the present application, the first polarizing component further comprises a second dielectric layer, wherein the second dielectric layer is stacked with the first polarizing layer and the second polarizing layer, and the second dielectric layer is disposed away from one side of the first dielectric grating layer.

In a possible implement of the present application, material of the first polarizing layer comprises one or more of gold, silver, copper, aluminum, chromium, metallic oxide, and alloy, and/or material of the second polarizing layer comprises one or more of gold, silver, copper, aluminum, metallic oxide, and alloy.

In a possible implement of the present application, material of the first dielectric grating layer comprises one or more of photoresist, resin, and polymer.

On the other hand, the present application provides an array substrate, wherein the array substrate comprises an abutment, an array functional layer, and an array polarizing component that are stacked with one another, and the array polarizing component comprises:

at least one first array dielectric layer;

an array dielectric grating layer, wherein the array dielectric grating layer is stacked with the first array dielectric layer, and ridges and grooves are arranged at intervals periodically on one side of the array dielectric grating layer away from the first array dielectric layer;

a first array polarizing layer, wherein the first array polarizing layer is located in the grooves of the array dielectric grating layer; and a second array polarizing layer, wherein the second array polarizing layer is located on the ridges of the array dielectric grating layer.

In a possible implement of the present application, the array polarizing component is disposed on one side of the abutment away from the array functional layer.

Further, the present application also provides a display panel, wherein the display panel comprises an array substrate, a color filter substrate and a liquid crystal layer, the array substrate is disposed opposite to the color filter substrate, the liquid crystal layer is located between the array substrate and the color filter substrate, wherein the array substrate comprises an abutment, an array functional layer, and an array polarizing component that are stacked with one another, and the array polarizing component comprises: at least one first array dielectric layer; an array dielectric grating layer, wherein the array dielectric grating layer is stacked with the first array dielectric layer, and ridges and grooves are arranged at intervals periodically on one side of the array dielectric grating layer away from the first array dielectric layer; a first array polarizing layer, wherein the first array polarizing layer is located in the grooves of the array dielectric grating layer; and a second array polarizing layer, wherein the second array polarizing layer is located on the ridges of the array dielectric grating layer, and/or, the color filter substrate comprises a first substrate, a color filter functional layer, and a first polarizing component that are stacked with one another;

wherein the first polarizing component comprises:
at least one first dielectric layer;
a first dielectric grating layer, wherein the first dielectric grating layer is stacked with the first dielectric layer, and ridges and grooves are arranged at intervals periodically on one side of the first dielectric grating layer away from the first dielectric layer;
a first polarizing layer, wherein the first polarizing layer is located in the grooves of the first dielectric grating layer; and
a second polarizing layer, wherein the second polarizing layer is located on the ridges of the first dielectric grating layer.

In a possible implement of the present application, the color filter functional layer is located between the first polarizing component and the first substrate.

In a possible implement of the present application, the color filter functional layer comprises a black matrix and a filter layer, the black matrix is provided with a plurality of matrix units, the filter layer comprises a plurality of filter units corresponding to the matrix units, and material of the filter units is quantum dots material.

In a possible implement of the present application, the first substrate is located between the first polarizing component and the color filter functional layer.

In a possible implement of the present application, the color filter functional layer is located on one side of the first polarizing component away from the first substrate.

In a possible implement of the present application, the first polarizing component further comprises:
a first base substrate, wherein the first base substrate is stacked with the first dielectric layer, and the first base substrate is located on one side of the first dielectric layer away from the first dielectric grating layer.

In a possible implement of the present application, the first polarizing component further comprises a second dielectric layer, wherein the second dielectric layer is stacked with the first polarizing layer and the second polarizing layer, and the second dielectric layer is disposed away from one side of the first dielectric grating layer.

In a possible implement of the present application, material of the first polarizing layer comprises one or more of gold, silver, copper, aluminum, chromium, metallic oxide, and alloy, and/or material of the second polarizing layer comprises one or more of gold, silver, copper, aluminum, metallic oxide, and alloy.

In a possible implement of the present application, material of the first dielectric grating layer comprises one or more of photoresist, resin, and polymer.

In the present application, by using the first polarizing component to replace polarizers on one side of existing color filter substrates, overall thicknesses of the color filter substrates and polarizing devices can be reduced effectively. In addition, utilizing structural relationships among the first dielectric grating layer, the first polarizing layer, and the second polarizing layer in the first polarizing component can polarize light effectively; at the same time, it can reduce absorption of the light, increase a light energy utilization rate, and reduce power consumption.

BRIEF DESCRIPTION OF DRAWINGS

In order to explain technical solutions in embodiments of the present application clearly, the following will introduce drawings needed in descriptions of the embodiments briefly. Obviously, the drawings in the following descriptions are only some embodiments of the present application, for those skilled in the art, other drawings can be obtained based on these drawings without creative work.

DETAILED DESCRIPTION OF PREFERRED EMBODIMENTS

Technical solutions in embodiments of the present application will be described clearly and completely combined with the accompanying drawings. Obviously, embodiments described below are only a part of the embodiments of the present application, rather than all the embodiments. Based on the embodiments in the present application, all other embodiments obtained by those skilled in the art without creative work shall fall the protection scope of the present application.

The embodiments of the present invention provide a color filter substrate, an array substrate, and a display panel, wherein the color filter substrate comprises a first substrate, a color filter functional layer, and a first polarizing component that are stacked with one another, and the first polarizing component comprises: at least one first dielectric layer; a first dielectric grating layer, wherein the first dielectric grating layer is stacked with the first dielectric layer, and ridges and grooves are arranged at intervals periodically on one side of the first dielectric grating layer away from the first dielectric layer; a first polarizing layer, wherein the first polarizing layer is located in the first in the grooves of the first dielectric grating layer; a second polarizing layer, wherein the second polarizing layer is located on the ridges of the first dielectric grating layer. The embodiments of the present application will be described in detail below.

Figure 1:
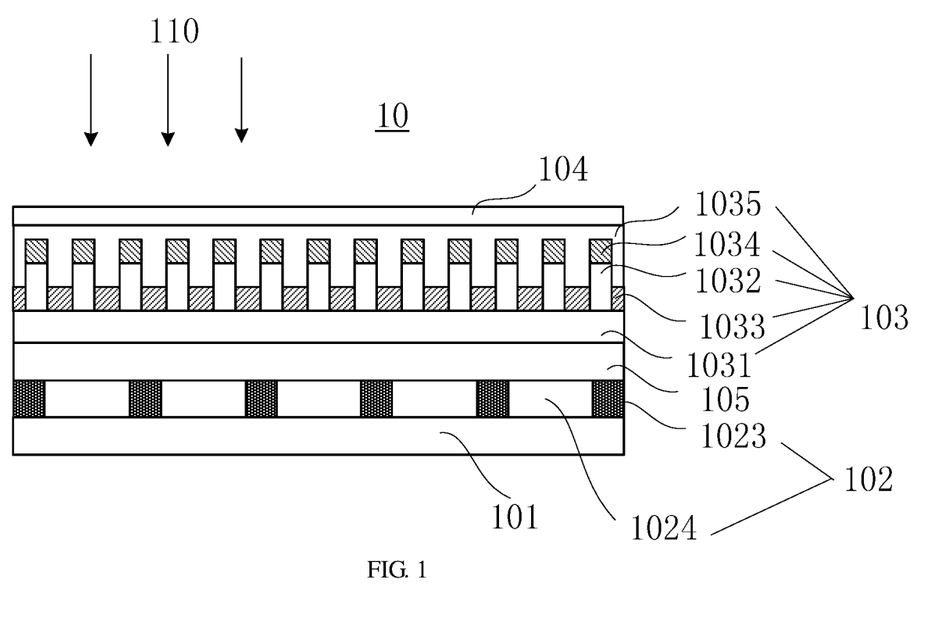
FIG. 1 is a schematic diagram of a first embodiment of a color filter substrate in the embodiments of the present invention.
Figure 2:
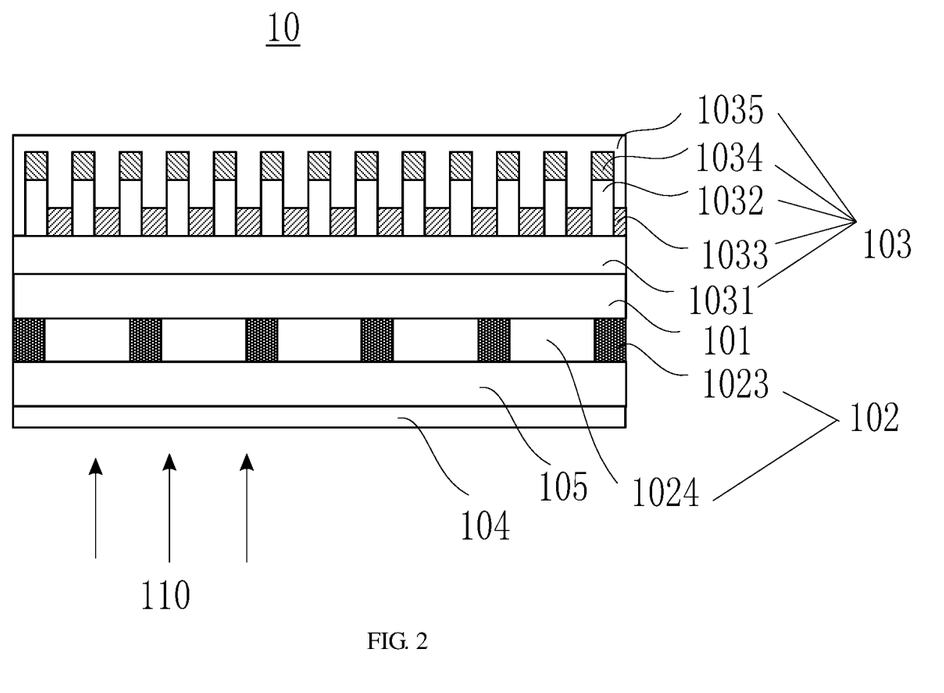
FIG. 2 is a schematic diagram of a second embodiment of a color filter substrate in the embodiments of the present invention.
Figure 3:
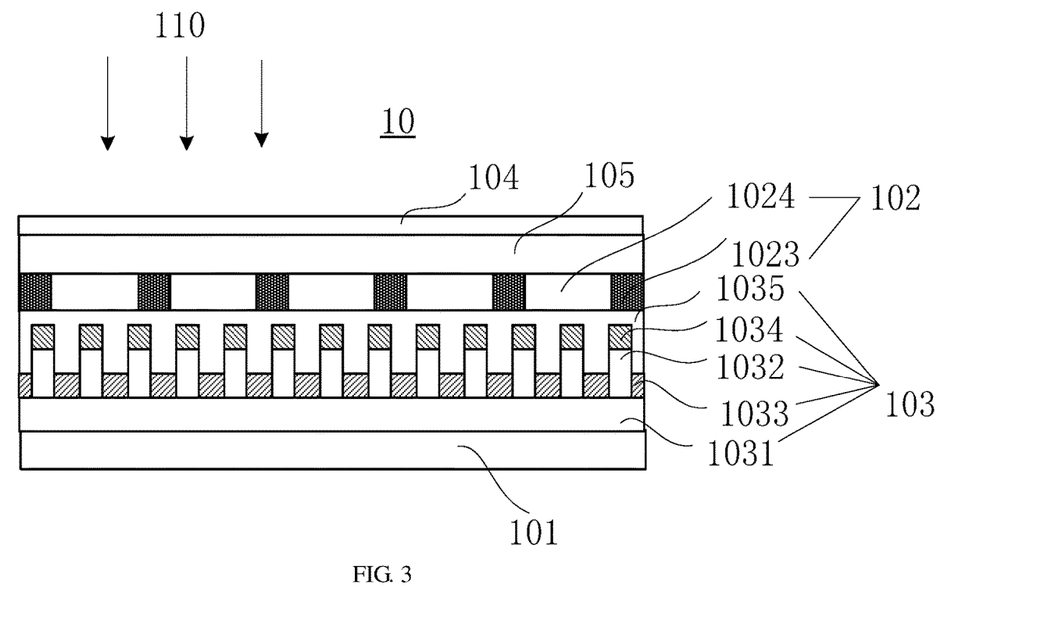
FIG. 3 is a schematic diagram of a third embodiment of a color filter substrate in the embodiments of the present application.
Figure 4:
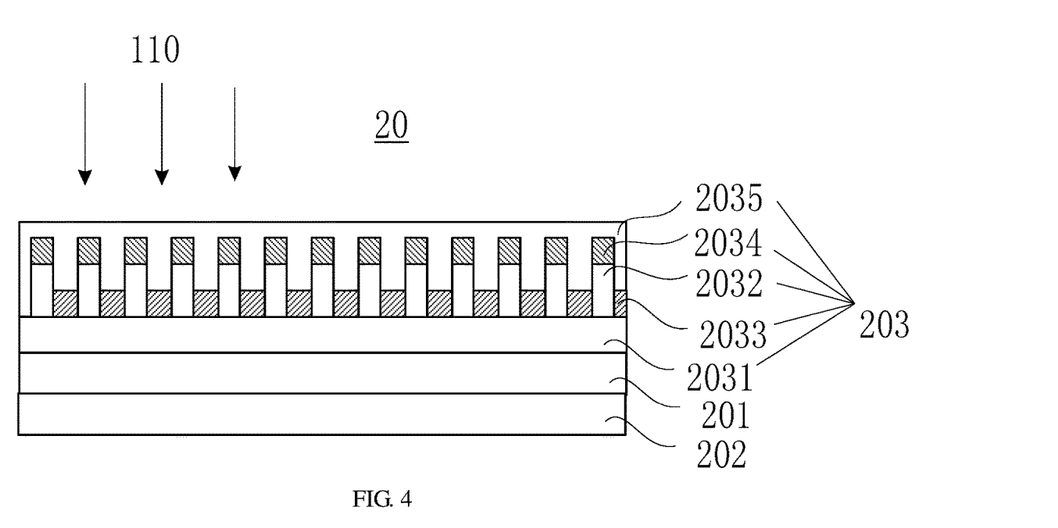
FIG. 4 is a schematic diagram of one embodiment of an array substrate in the embodiments of the present application.
Figure 5:
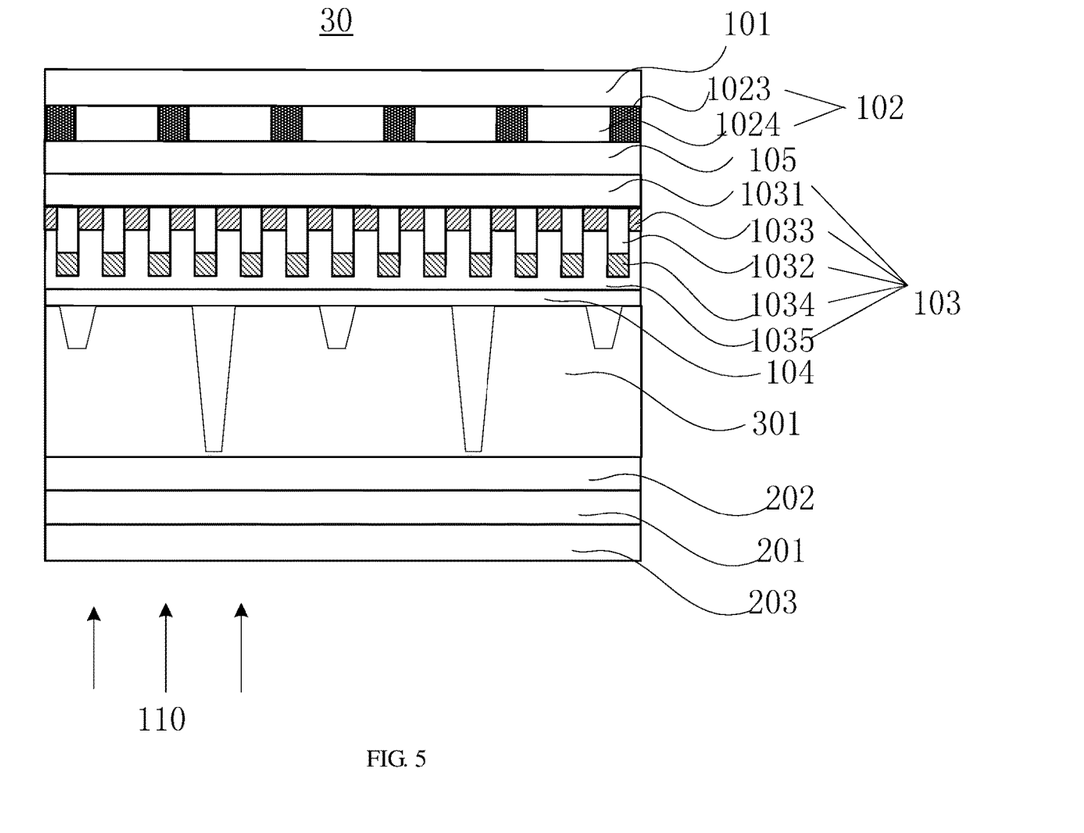
FIG. 5 is a schematic diagram of one embodiment of a display panel in the embodiments of the present application.

Please refer to FIG. 1 to FIG. 5, FIG. 1 is a schematic diagram of a first embodiment of the color filter substrate in the embodiments of the present invention, FIG. 2 is a schematic diagram of a second embodiment of the color filter substrate in the embodiments of the present invention, FIG. 3 is a schematic diagram of a third embodiment of the color filter substrate in the embodiments of the present application, FIG. 4 is a schematic diagram of one embodiment of the array substrate in the embodiments of the present application, and FIG. 5 is a schematic diagram of one embodiment of the display panel in the embodiments of the present application.

Combining FIG. 1, FIG. 2, and FIG. 3, in the embodiments of the present invention, the color filter substrate 10 comprises the first substrate 101, the color filter functional layer 102, and the first polarizing component 103, and the first polarizing component 103 comprises: at least one first dielectric layer 1031; the first dielectric grating layer 1032, wherein the first dielectric grating layer 1032 is stacked with the first dielectric layer 1031, and ridges and grooves are arranged at intervals periodically on one side of the first dielectric grating layer 1032 away from the first dielectric layer 1031; the first polarizing layer 1033, wherein the first polarizing layer 1033 is located in the grooves of the first dielectric grating layer 1032; and the second polarizing layer 1034, wherein the second polarizing layer 1034 is located on the ridges of the first dielectric grating layer 1032.

Among structures mentioned above, at least one the first dielectric layer 1031 can be one, two, or more layers, for example, the first dielectric layer 1031 can be formed specifically by three layers of the first dielectric layer 1031 which are stacked with one another. However, a number of the first dielectric layer 1031 can also be determined according to actual situations, so it is not limited here. Besides, by determining the number of the first dielectric layer 1031, a thickness and a refractive index of the first dielectric layer 1031 can be adjusted, and optical characteristics of the first polarizing component 103 can be further improved.

Material of the first polarizing layer 1033 comprises one or more of gold, silver, copper, aluminum, chromium, metallic oxide, and alloy, for example, the material of the first polarizing layer 1033 can be an alloy composed of copper and aluminum. However, the material of the first polarizing layer 1033 in the present application is not limited to metal, metallic oxide, or alloy, specifically, it can also be other materials, such as polymers or non-metallic elements, wherein aluminum is preferably used as material of a metal layer because of its excellent optical properties in the visible light band. And/or, material of the second polarizing layer 1034 comprises one or more of gold, silver, copper, aluminum, metallic oxide, and alloy, for example, the material of the second polarizing layer 1034 can be an alloy composed of copper and aluminum. However, the material of the second polarizing layer 1034 in the present application is not limited to metal, metallic oxide, or alloy, specifically, it can also be other materials, such as polymers and non-metallic elements, wherein aluminum is preferably used as material of a metal layer because of its excellent optical properties in the visible light band.

In the embodiments of the present application, performance of the first polarizing component 103 is strongly related to structures of the first dielectric grating layer 1032, the first polarizing layer 1033, and the second polarizing layer 1034, wherein a period of the first dielectric grating layer 1032 is from 50 nm to 500 nm, a duty cycle of the first dielectric grating layer 1032 is from 0.1 to 0.9, a height of each ridge of the first dielectric grating layer 1032 is from 50 nm to 250 nm, and a thickness of the first polarizing layer 1033 is from 50 nm to 250 nm, wherein the specific thickness of the first polarizing layer 1033 can be adjusted according to the height of each ridge of the first dielectric grating layer 1032. Similarly, a thickness of the second polarizing layer 1034 is from 50 nm to 250 nm, wherein the specific thickness of the second polarizing layer 1034 can be adjusted according to the height of each ridge of the first dielectric grating layer 1032.

Material of the first dielectric grating layer 1032 comprises one or more of photoresist, resin, and polymer, for example, the material of the first dielectric grating layer 1032 is a mixed material composed of photoresist material and resin material.

In the embodiments of the present application, the color filter functional layer 102 can comprise a black matrix and a filter layer, the black matrix comprises a plurality of matrix units 1023, the filter layer comprises a plurality of filter units 1024 corresponding to the matrix units 1023, wherein material of the filter units 1024 can be color resist material or quantum dots material.

It should be noted that the color filter substrate 10 further comprises a flat layer 105 and an alignment layer 104. Lamination positions of the first substrate 101, the color filter functional layer 102, and the first polarizing component 103 in the color filter substrate 10 comprise at least three situations. Specifically, as shown in FIG. 1, the color filter functional layer 102 is located between the first polarizing component 103 and the first substrate 101 in the first embodiment; as shown in FIG. 2, the first substrate 101 is located between the first polarizing component 103 and the color filter functional layer 102 in the second embodiment; and as shown in FIG. 3, the color filter functional layer 102 is located on one side of the first polarizing component 103 away from the first substrate 101 in the third embodiment.

In the present application, by using the first polarizing component 103 to replace polarizers on one side of existing color filter substrates, overall thicknesses of the color filter substrate 10 and polarizing devices can be reduced effectively. In addition, utilizing structural relationships among the first dielectric grating layer 1032, the first polarizing layer 1033, and the second polarizing layer 1034 in the first polarizing component 103 can polarize light effectively, at the same time, it can reduce absorption of the light, increase a light energy utilization rate and reduce power consumption.

As shown in FIG. 1, in the first embodiment of the present application, the color filter functional layer 102 is located between the first polarizing component 103 and the first substrate 101. In actual application process, the color filter substrate 10 can be applied to a liquid crystal display device, wherein the liquid crystal display device comprises a backlight 110, a lower polarizer, the array substrate 20, and a liquid crystal layer 301. Specific position of the color filter substrate 10 in the liquid crystal display device can be determined by transmission direction of light in the present application, for example, when a source of the backlight 110 generates the backlight 110 for display, the backlight 110 will pass through the lower polarizer, the array substrate 20, the liquid crystal layer 301, the alignment layer 104, the first polarizing component 103, the flat layer 105, the color filter functional layer 102, and the first substrate 101 sequentially.

Specifically, the color filter functional layer 102 comprises the black matrix and the filter layer, the black matrix is provided with a plurality of matrix units 1023, the filter layer comprises a plurality of filter units 1024 corresponding to the matrix units 1023, and the material of the filter units 1024 is quantum dots material. Wherein the quantum dots comprise red quantum dots, green quantum dots, and blue quantum dots. When the color filter substrate 10 uses quantum dots material as the material of the filter units 1024, since luminescence of the quantum dots is spontaneous radiation, so when the quantum dots are excited by light with a certain polarization direction, the light emitted by the quantum dots is isotropic and non-polarizing, at this time, if the existing polarizer is disposed on the color filter substrate 10, it is unable to achieve on and off of the light. Therefore, for the case where the quantum dots material is used as the material of the filter units 1024 in the embodiments of the present application, by using the first polarizing component 103 instead of the existing upper polarizer, integrating the first polarizing component 103 into the color filter substrate 10, and disposing the first polarizing component 103 on one side of the color filter substrate 10 away from the first substrate 101, it is achievable to adjust the light generated by the quantum dots, so as to realize a technical solution of using the quantum dots material to replace the color resist material.

In the embodiments of the present application, the first polarizing component 103 further comprises a first base substrate, wherein the first base substrate is stacked with the first dielectric layer 1031, and the first base substrate is located on one side of the first dielectric layer 1031 away from the first dielectric grating layer 1032, an arrangement of the first base substrate described above can make the first polarizing component 103 more stable. It should be noted that the first polarizing component 103 can be disposed on other films in the color filter substrate 10 according to actual demands.

In the embodiments of the present application, the first polarizing component 103 further comprises a second dielectric layer 1035, the second dielectric layer 1035 is stacked with the first polarizing layer 1033 and the second polarizing layer 1034, and the second dielectric layer 1035 is disposed on one side away from the first dielectric grating layer 1032. By arranging the second dielectric layer 1035 in the first polarizing component 103, the second dielectric layer 1035 can protect the first polarizing component 103 or serve as the flat layer 105 to improve flatness above the first polarizing layer 1033 and the second polarizing layer 1034.

In the descriptions of the present application, it can be understood that orientation or location relationships indicated by terms "center", "longitudinal", "transverse", "length", "width", "thickness", "upper", "lower", "front", "back", "left", "right", "vertical", "horizontal", "top", "bottom", "inner" and "outer" are based on orientation or location relationships shown in the drawings, which is only for the convenience of describing the present application and simplifying description, rather than indicating or implying that a device or an element referred must have a specific orientation, be constructed and operated in a specific orientation, so it cannot be understood as a limitation to the present application. In addition, terms "first" and "second" are only used for descriptive purpose, and cannot be understood as indicating or implying relative importance or implicitly indicating numbers of a technical feature indicated. Therefore, features defined with the "first" or the "second" can comprise one or more of the features explicitly or implicitly. In the description of the present application, a term "a plurality of" means two or more than two, unless otherwise specifically defined.

In order to implement the color filter substrate 10 in the embodiments of the present application better, one embodiment of the present application provides the array substrate 20 on the basis of the color filter substrate 10. As shown in FIG. 4, the array substrate 20 comprises an abutment 201, an array functional layer 202, and an array polarizing component 203 that are stacked with one another, and the array polarizing component 203 comprises:

at least one first array dielectric layer 2031;

an array dielectric grating layer 2032, wherein the array dielectric grating layer 2032 is stacked with the first array dielectric layer 2031, and ridges and grooves are arranged at intervals periodically on one side of the array dielectric grating layer 2032 away from the first array dielectric layer 2031;

a first array polarizing layer 2033, wherein the first array polarizing layer 2033 is located in the grooves of the array dielectric grating layer 2032; and a second array polarizing layer 2034, wherein the second array polarizing layer 2034 is located on the ridges of the array dielectric grating layer 2032.

Wherein a structure and a function of the first array dielectric layer 2031 are the same as a structure and a function of the first dielectric layer 1031 mentioned above, which will not be repeated here.

It should be noted that in order to realize a polarization of light, the array polarizing component 203 and the first polarizing component 103 are disposed correspondingly, but specific relationships between their relative position is not limited, as long as the array polarizing component 203 and the first polarizing component 103 can work together, for example, an extension direction of the ridges in the first dielectric grating layer 1032 in the first polarizing component 103 and an extension direction of the ridges in the array dielectric grating layer 2032 in the array polarizing component 203 are perpendicular to each other.

In the embodiment of the present application, the array polarizing component 203 is disposed on one side of the abutment 201 away from the array functional layer 202.

In the embodiment of the present application, the second polarizing component 203 further comprises a fourth dielectric layer 2035, the fourth dielectric layer is stacked with the third polarizing layer and the fourth polarizing layer, and the fourth dielectric layer is disposed away from one side of the third polarizing layer. Wherein a structure and a function of the fourth dielectric layer are the same as a structure and a function of the second dielectric layer 1035, which will not be repeated here.

The present application uses the array polarizing component 203 to replace polarizers on one side of the existing array substrate 20, so that thicknesses of electronic devices using the array substrate 20 can be reduced greatly. In addition, since the array polarizing component 203 has good transmission characteristics, reflection characteristics, and polarization performance, and the array polarizing component 203 can transmit light whose polarization direction is perpendicular to a direction of the grating grid line (TM polarization) and reflect the light whose polarization direction is parallel to the direction of the grating grid line (TE polarization), so under a specific structural design, combined with a reflective layer on the backlight 110, this part of reflected light can be reused, thereby further increasing an utilization of light efficiency.

It should be noted that the present application is not limited to disposing the array polarizing component 203 on one side of the abutment 201 away from the array functional layer 202, the array polarizing component 203 can also be integrated into the array functional layer 202, specific locations of the array polarizing component 203 can be adjusted according to actual demands, and it is no limitation here.

In the present application, a word "exemplary" is used to express "serving as an example, an illustration, or a direction." Any embodiment described as "exemplary" in the present application is not necessarily construed as being more preferred or advantageous than other embodiments. In order to enable those skilled in the art to realize and use the present application, following descriptions is given. And in the following descriptions, details are listed for the purpose of explanation. It should be understood that those skilled in the art can realize that the present application can also be implemented without using these specific details. In other embodiments, well-known structures and processes will not be described in detail to avoid unnecessary details to obscure the descriptions of the present application. Therefore, the present application is not intended to be limited to the embodiments illustrated, but is consistent with a widest scope that conforms to principles and features disclosed in this application.

In order to implement the color filter substrate 10 in the embodiments of the present application better, one embodiment of the present application further provides the display panel 30 based on the color filter substrate 10 mentioned above. As shown in FIG. 5, the display panel 30 comprises the array substrate 20, the color filter substrate 10 and the liquid crystal layer 301, the array substrate 20 is disposed opposite to the color filter substrate 10, and the liquid crystal layer 301 is located between the array substrate 20 and the color filter substrate 10.

It should be noted that FIG. 5 only shows a drawing provided for the convenience of understanding, it does not cover all combinations between the color filter substrate 10 and the array substrate 20. Lamination positions of the first substrate 101, the color filter functional layer 102, and the first polarizing component 103 in the color filter substrate 10 comprise at least three situations. Specifically, as shown in FIG. 1, the color filter functional layer 102 is located between the first polarizing component 103 and the first substrate 101 in the first embodiment; as shown in FIG. 2, the first substrate 101 is located between the first polarizing component 103 and the color filter functional layer 102 in the second embodiment; and as shown in FIG. 3, the color filter functional layer 102 is located on one side of the first polarizing component 103 away from the first substrate 101 in the third embodiment. It can be understood that the present application is not limited to disposing the array polarizing component 203 on one side of the abutment 201 away from the array functional layer 202, the array polarizing component 203 can also be integrated into the array functional layer 202. Among them, three structures of the color filter substrate 10 mentioned above and two structures of the array substrate 20 can combine with each other according to actual demands and effects, so specific combinations of the structures will be not repeated here.

In the present application, by using the first polarizing component 103 to replace the polarizers on one side of the existing color filter substrate, the overall thicknesses of the color filter substrate 10 and the polarizing devices can be reduced effectively. In addition, utilizing the structural relationships among the first dielectric grating layer 1032, the first polarizing layer 1033, and the second polarizing layer 1034 in the first polarizing component 103 can polarize the light effectively, at the same time, it can reduce the absorption of the light, increase the light energy utilization rate, and reduce the power consumption. Further, the present application uses the array polarizing component 203 to replace the polarizers on one side of the existing array substrate 20, so that the thicknesses of the electronic devices using the array substrate 20 can be reduced greatly. In addition, since the array polarizing component 203 has good transmission characteristics, reflection characteristics, and polarization performance, and the array polarizing component 203 can transmit the light whose polarization direction is perpendicular to the direction of the grating grid line (TM polarization) and reflect the light whose polarization direction is parallel to the direction of the grating grid line (TE polarization), so under the specific structural design, combined with the reflective layer on the backlight 110, this part of reflected light can be reused, thereby further increasing the utilization of light efficiency.

The color filter substrate 10, the array substrate 20, and the display panel 30 provided by the embodiments of the present application are described in details above. Specific embodiments are used in this article to illustrate principles and implementations of the present application, the descriptions of the embodiments mentioned above is only used to help understanding methods and core ideas of this application; at the same time, for those skilled in the art, there will be changes in specific implementations and scopes of application according to the core ideas of this application. In summary, contents of the descriptions mentioned above should not be construed as a limitation on this application.

What is claimed is:

1. A color filter substrate, wherein the color filter substrate comprises a first substrate, a color filter functional layer, and a first polarizing component that are stacked with one another, and the first polarizing component comprises:
   at least one first dielectric layer;
   a first dielectric grating layer, wherein the first dielectric grating layer is stacked with the first dielectric layer, and ridges and grooves are arranged at intervals periodically on one side of the first dielectric grating layer away from the first dielectric layer;
   a first polarizing layer, wherein the first polarizing layer is located in the grooves of the first dielectric grating layer; and
   a second polarizing layer, wherein the second polarizing layer is located on the ridges of the first dielectric grating layer;
   wherein a spacing between a top of the first polarizing layer located in each of the grooves and a top of the second polarizing layer located on the ridges adjacent to the each of the grooves in an arrangement direction of the grooves is 0.

2. The color filter substrate according to claim 1, wherein the color filter functional layer is located between the first polarizing component and the first substrate.

3. The color filter substrate according to claim 2, wherein the color filter functional layer comprises a black matrix and a filter layer, the black matrix is provided with a plurality of matrix units, the filter layer comprises a plurality of filter units corresponding to the matrix units, and material of the filter units is quantum dots material.

4. The color filter substrate according to claim 1, wherein the first substrate is located between the first polarizing component and the color filter functional layer.

5. The color filter substrate according to claim 1, wherein the color filter functional layer is located on one side of the first polarizing component away from the first substrate.

6. The color filter substrate according to claim 1, wherein the first polarizing component further comprises:
 a first base substrate, wherein the first base substrate is stacked with the first dielectric layer, and the first base substrate is located on one side of the first dielectric layer away from the first dielectric grating layer.

7. The color filter substrate according to claim 1, wherein the first polarizing component further comprises a second dielectric layer, wherein the second dielectric layer is stacked with the first polarizing layer and the second polarizing layer, and the second dielectric layer is disposed away from one side of the first dielectric grating layer.

8. The color filter substrate according to claim 1, wherein material of the first polarizing layer comprises one or more of gold, silver, copper, aluminum, chromium, metallic oxide, and alloy, and/or material of the second polarizing layer comprises one or more of gold, silver, copper, aluminum, metallic oxide, and alloy.

9. The color filter substrate according to claim 1, wherein material of the first dielectric grating layer comprises one or more of photoresist, resin, and polymer.

10. A display panel, wherein the display panel comprises an array substrate, a color filter substrate, and a liquid crystal layer, the array substrate is disposed opposite to the color filter substrate, the liquid crystal layer is located between the array substrate and the color filter substrate, wherein the color filter substrate comprises a first substrate, a color filter functional layer, and a first polarizing component that are stacked with one another;
 wherein the first polarizing component comprises:
 at least one first dielectric layer;
 a first dielectric grating layer, wherein the first dielectric grating layer is stacked with the first dielectric layer, and ridges and grooves are arranged at intervals periodically on one side of the first dielectric grating layer away from the first dielectric layer;
 a first polarizing layer, wherein the first polarizing layer is located in the grooves of the first dielectric grating layer; and
 a second polarizing layer, wherein the second polarizing layer is located on the ridges of the first dielectric grating layer;
 wherein a spacing between a top of the first polarizing layer located in each of the grooves and a top of the second polarizing layer located on the ridges adjacent to the each of the grooves in an arrangement direction of the grooves is 0.

11. The display panel according to claim 10, wherein the color filter functional layer is located between the first polarizing component and the first substrate.

12. The display panel according to claim 11, wherein the color filter functional layer comprises a black matrix and a filter layer, the black matrix is provided with a plurality of matrix units, the filter layer comprises a plurality of filter units corresponding to the matrix units, and material of the filter units is quantum dots material.

13. The display panel according to claim 10, wherein the first substrate is located between the first polarizing component and the color filter functional layer.

14. The display panel according to claim 10, wherein the color filter functional layer is located on one side of the first polarizing component away from the first substrate.

15. The display panel according to claim 10, wherein the first polarizing component further comprises:
 a first base substrate, wherein the first base substrate is stacked with the first dielectric layer, and the first base substrate is located on one side of the first dielectric layer away from the first dielectric grating layer.

16. The display panel according to claim 10, wherein the first polarizing component further comprises a second dielectric layer, wherein the second dielectric layer is stacked with the first polarizing layer and the second polarizing layer, and the second dielectric layer is disposed away from one side of the first dielectric grating layer.

17. The display panel according to claim 10, wherein material of the first polarizing layer comprises one or more of gold, silver, copper, aluminum, chromium, metallic oxide, and alloy, and/or material of the second polarizing layer comprises one or more of gold, silver, copper, aluminum, metallic oxide, and alloy.

18. The display panel according to claim 10, wherein material of the first dielectric grating layer comprises one or more of photoresist, resin, and polymer.

* * * * *